Dec. 14, 1965   G. M. DICK   3,223,239
PRESSURE TYPE SCREENING DEVICES
Filed May 11, 1962   7 Sheets-Sheet 1

INVENTOR
GEORGE M. DICK

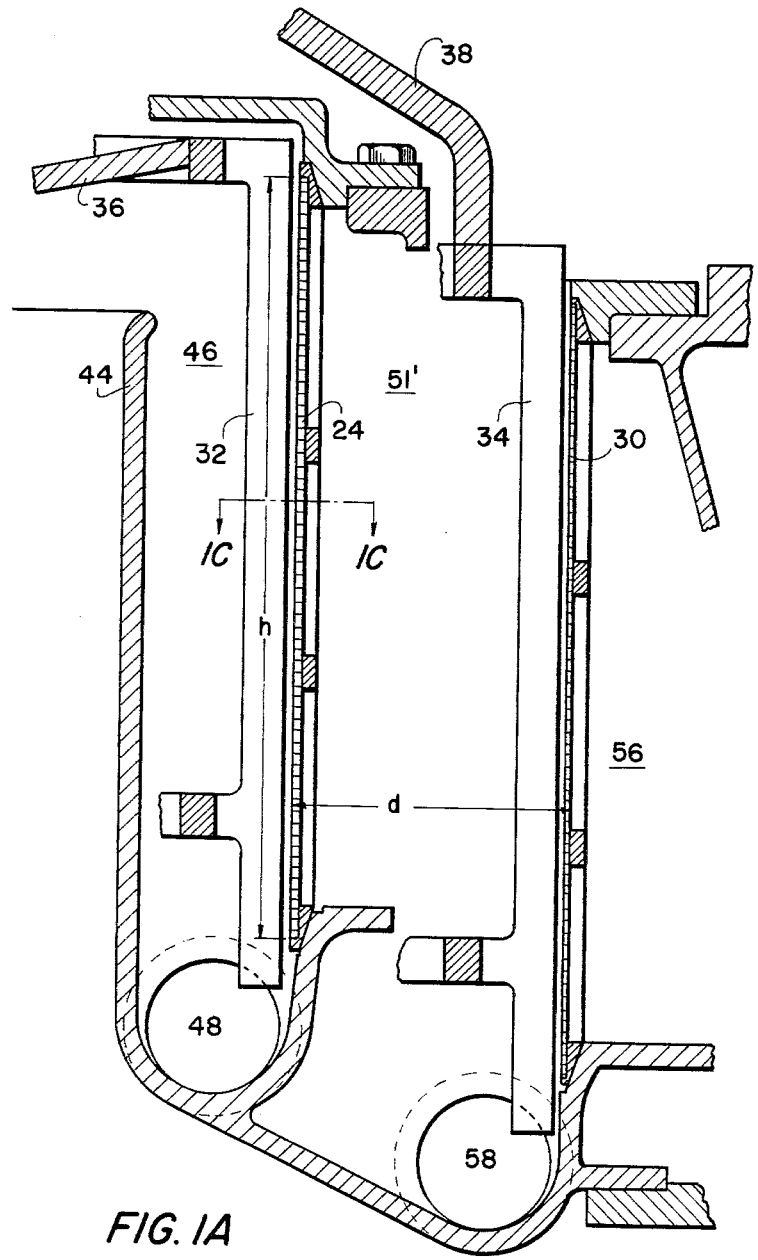
FIG. IA

INVENTOR
GEORGE M. DICK

Dec. 14, 1965    G. M. DICK    3,223,239
PRESSURE TYPE SCREENING DEVICES
Filed May 11, 1962    7 Sheets-Sheet 4

INVENTOR
GEORGE M. DICK

INVENTOR
GEORGE M. DICK

INVENTOR
GEORGE M. DICK

United States Patent Office 3,223,239
Patented Dec. 14, 1965

3,223,239
PRESSURE TYPE SCREENING DEVICES
George M. Dick, Sherbrooke, Quebec, Canada, assignor to Bird Machine Company, South Walpole, Mass., a corporation of Massachusetts
Filed May 11, 1962, Ser. No. 193,962
6 Claims. (Cl. 209—270)

The present invention relates to pressure type screening devices and more particularly to improved plural stage pressure type screening devices.

Heretofore, paper stock for a paper making machine was screened to remove shives, slivers and bark particles originating in the wood and foreign matter comprising a variety of particles of mineral matter, grinder grit, glass, etc., by screening devices of the type shown in U.S. Reissue Patent No. 24,677, issued July 28, 1959, to J. H. Martindale; Swedish Patent No. 79,843, issued March 29, 1929, to J. D. Ullgren; and German Patent No. 599,616, issued June 14, 1934, to E. Buchhaas.

Recently however improved higher speed paper making machines have created the need for totally enclosed single stage screening devices of the type shown in U.S. Patent No. 2,975,899, issued March 21, 1961, to M. M. Cannon et al. These improved screening devices are accurately controlled and operate from a single fan pump, thus assuring a continuous high speed free flow of stock to the paper making machine.

Such a single stage pressure type screening device is selective in long fiber removal action and in the concentration of rejects in a wide range of unscreened paper stock inlet flow and reject flow. Because of its simplicity of design, ease of maintenance and satisfactory screen life, the mechanical downtime of such a single stage pressure type screening device is almost negligible. This single stage pressure type screening device has the advantage of operating at pressures above atmospheric pressure so that the accepted screened stock coming out of the device is under pressure and can, therefore, be directed by a closed piping system to the next apparatus in the process. Since the unscreened stock inlet to the single stage pressure type screening device is also under pressure, the screening device, together with its inlet and outlet piping, is completely enclosed, thus eliminating the disadvantages of the prior art screening devices (i.e., directing the paper stock in open troughs with the consequent disadvantages of splashing, etc.) and of accumulating undesirable dirt and foreign material in such open troughs.

This single stage pressure type screening device may utilize vanes or hydrofoils (of the type shown in U.S. Patent application Serial No. 763,003 filed September 24, 1958, and now Patent No. 3,029,951, by M. M. Cannon) and may also embody a tangential reject outlet or inlet gutter trap (of the type shown in U.S. Patent application Serial No. 787,291 filed January 16, 1959, and now Patent No. 3,092,578 by M. M. Cannon et al.); an outward flow pressure screen (of the type shown in U.S. Patent application Serial No. 811,136 filed May 5, 1959, and now Patent No. 3,149,067, by M. M. Cannon et al.); and a high efficiency screen (of the type shown in U.S. Patent application Serial No. 834,143 filed August 17, 1959, and now Patent No. 3,053,391 by G. L. Nelson).

One object of the present invention is to provide a plural stage screening device having markedly greater efficiency than can be provided by arranging two conventional single stage screens in series. By "greater efficiency" is meant either a higher flow rate for a given screen or an equal flow rate using a finer mesh screen for at least one stage.

Another object of the present invention is to avoid and overcome the difficulties of and objections to prior art practices, some of which are mentioned above, by the provision of an improved plural stage pressure type screening device which eliminates the need for two separate single stage pressure type screening devices for two stage operation, thus reducing the required floor space and the amount of piping, number of valves, etc., heretofore required for such two stage screening operation.

Another object of the present invention is to provide an improved plural stage pressure type screening device which maintains the paper or pulp stock in a homogeneous condition (i.e., uniform fiber density or uniform percentage of fibers/cc.) and a more uniform fiber particle formation within each unit of volume.

A further object of the present invention is the provision of an improved plural stage pressure type screening device which segregates the undesirable rejects into a first stage rejects stream (i.e., most undesirable) which are fed back into the system at an early stage and into a second stage rejects stream (less undesirable) which are fed back into the system at an intermediate point, thus effecting a saving in processing.

Yet another object of the present invention is the provision of an improved plural stage pressure type screening device with improved screen cleaning characteristics and resultant higher production output of screened paper stock.

The aforesaid objects of the present invention, and other objects which will become apparent as the description proceeds, are achieved by providing an improved plural stage screening device for a paper making system and for screening a pressurized liquid suspension having particles therein. This screening device has first stage screening means for screening the liquid suspension and passing therethrough a homogeneous first stage portion of said liquid suspension.

A second stage screening means is disposed concentric with the first stage screening means for finer screening of the first stage portion of the liquid suspension and passing therethrough a finer second stage portion of the liquid suspension. The second stage screening means is disposed with respect to the first stage screening means so that the flow of suspension from the latter to the former is accomplished with a minimum of turbulence, the flow preferably being either directly radially outwardly from one screen to the other or being turned to cause it to sweep across the face of the second screen in a direction parallel to the axis and to the face thereof.

In order to achieve the desired increased efficiency in the device, it is important that the length of the path traversed by any portion of the liquid suspension in passing from any part of one screen to any part of the next in succession be limited to no more than four feet in machines which are to be used in the conventional range of flow rates, from two to eighteen feet per second. This limitation on the length of travel of the suspension ensures that no appreciable amount of flocking of the particles of suspension can occur between the first screen (which eliminates the flock present in the suspension when it enters the screen) and the next successive screen. This makes it possible either to obtain a higher flow rate per unit area through the second screen than would otherwise be the case (enabling the size of the screen to be decreased) or to use a second screen having smaller apertures at the same flow rate per unit area (enabling more effective and more complete removal of undesired particles).

It is found that the desired short travel path from one screen to the next is best achieved by providing screens in cylindrical form mounted concentrically one outside the other with the radial spacing between screens limited to a maximum of one foot. The radial spacing between screens may be as little as three inches in some cases, although usually more space is desirable to facilitate construction and assembly, particularly when a movable cleaning means is mounted between the screens. The maximum overall diameter of the outer screen is limited to about five feet by practical and economic considerations.

First stage cleaning means are disposed adjacent the first stage screening means for removing clogging particles from the first stage screening means, and second stage cleaning means are disposed adjacent the second stage screening means for removing clogging particles from the second stage screening means. Drive means are operatively associated with the first and second stage screening means and the first and second stage cleaning means for causing relative rotary movement between the first and second stage screening means and the first and second stage cleaning means.

For a better understanding of the present invention, reference should be had to the accompanying drawings, wherein like numerals of reference indicate similar parts throughout the several views and wherein:

FIG. 1A is an enlarged fragmentary vertical sectional view of a portion of FIG. 1 containing the first stage screening means and second stage screening means;

Although the principles of the present invention are broadly applicable to the screening of paper stock, cellulose stock and the like, the present invention is particularly adapted for use in conjunction with the screening of paper stock, wood pulp, chemically prepared pulp and other similar materials and hence it has been so illustrated and will be so described.

Figures 1, 1C:
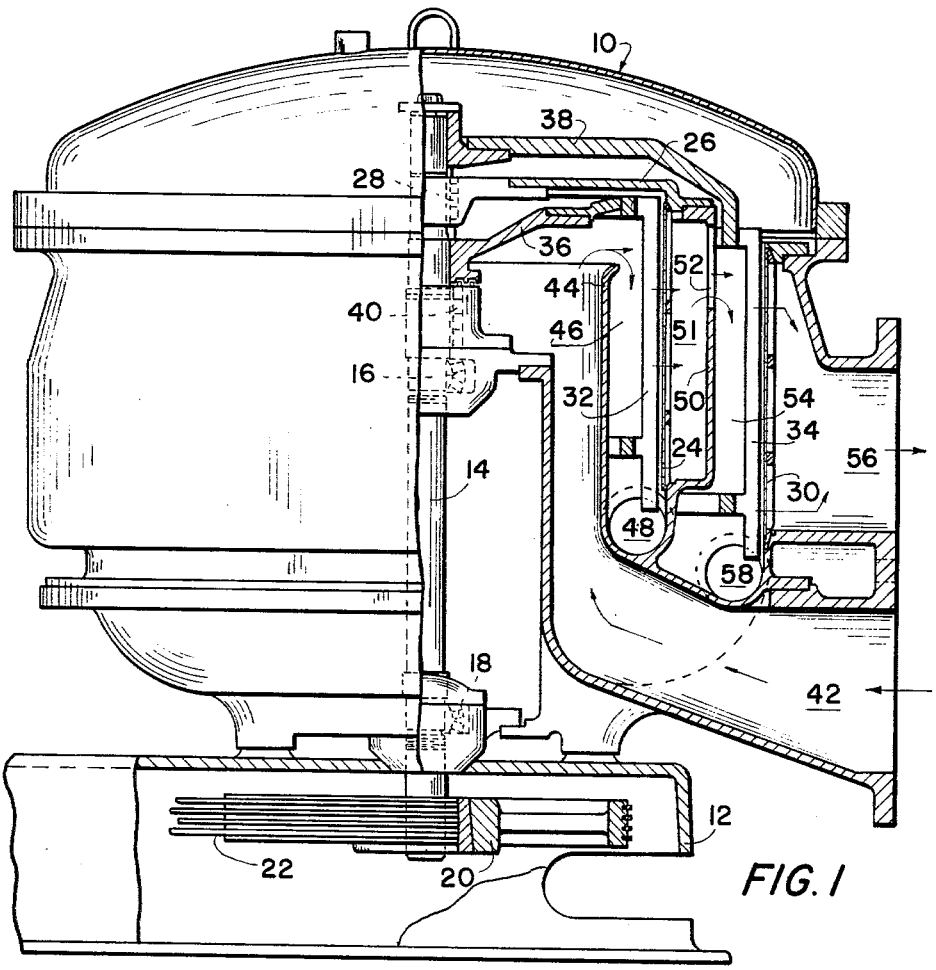
FIG. 1 is a vertical sectional view of a two-stage outward flow pressure type screening device of the present invention.
FIG. 1C is an enlarged fragmentary side elevational view of the screening of desirable fibers from undesirable material and taken along the line 1C—1C of FIG. 1A.

With specific reference to the form of the present invention illustrated in the drawings and referring particularly to FIG. 1, an improved plural stage pressure type screening device is indicated generally by the reference numeral 10. This plural stage pressure type screening device has a frame 12 in which a rotatable vertical shaft 14 is journaled in suitable bearings 16 and 18. In order to provide drive means for the rotatable shaft 14, a multiple V-belt pulley 20 is mounted on the bottom of the rotatable shaft 14 and is connected by a conventional belt drive 22 to a suitable source of power, such as an electric motor (not shown).

The mounting means employed for a first stage screening means, such as a first stage screen 24 (of the type shown in U.S. Patent No. 2,975,899), comprises the frame 10 at its lower end as viewed in FIG. 1 and a cover plate 26 at its upper end, which cover plate is mounted on an upper seal 28 disposed about the rotatable shaft 14. To the right of the first stage screen 24, FIG. 1, a second stage screening means, such as a second stage screen 30 (similar to first stage screen 24 but of finer mesh than the screen 24), is secured at each end in the frame 10. This first stage screening means screens the pressurized liquid suspension and passes therethrough a homogeneous first stage portion of the liquid suspension, the homogeneous first stage portion having a uniform density of particles. Similarly the second stage screening means disposed concentric with the first stage screening means for the same screening or the finer screening of the homogeneous first stage portion of the liquid suspension passes therethrough the same or a finer homogeneous second stage portion of the liquid suspension, the homogeneous second stage portion also having a uniform density of particles.

The structure utilized for supporting a first stage cleaning means, such as a plurality of first vanes or hydrofoils 32 and a second stage cleaning means, such as a plurality of second vanes or hydrofoils 34, comprise, respectively, a first spider 36 and a second spider 38, the spiders 36 and 38 being secured to the rotatable shaft 14. Disposed between the first spider 36 and the bearing 16 is a second seal 40. The hydrofoils 32 and 34 are similar to those shown in U.S. Patent No. 2,975,899. The first stage cleaning means disposed adjacent the first stage screening means removes clogging particles from the first stage screening means.

The second stage cleaning means disposed adjacent said second stage screening means removes clogging particles from the second stage screening means.

It will be understood by those skilled in the art that the primary purpose of the drive means (which is operatively associated with the first and second stage screening means and the first and second stage cleaning means) is for causing relative rotary movement between the first and second stage screening means and the first and second stage cleaning means. The drive means can be utilized to rotate the screens 24 and 30 while the hydrofoils 32 and 34 are held stationary to achieve the desired screening results.

Referring to FIG. 1, unscreened paper or pulp stock enters unscreened stock inlet 42 (tangentially and under pressure), flows upwardly (in the direction of the arrows) along a first stage baffle means or plate 44 and then flows downwardly under the influence of gravity and of the pressure of the stock supply into a first receiving chamber means, such as the first receiving chamber 46, defined by the first stage baffle plate 44 and the first stage screen 24 for reception of such pressurized liquid suspension. In this first receiving chamber 46, the flow of the liquid suspension is generally parallel to the axis of screen 24 and toward reject gutter 48. The plurality of first stage hydrofoils 32 are rotatable along the inner periphery of the first stage screen 24 in close proximity to, but not in contact with, the first stage screen 24 to cause momentary back flushing through the first stage screen 24 and breaking up of the incipient mattings of paper stock on such first stage screen 24 and thus to keep the perforations in such first stage screen 24 open. If desired, hydrofoils 32 may have an overall helical shape to urge the stock downwardly as they rotate.

Figure 2:
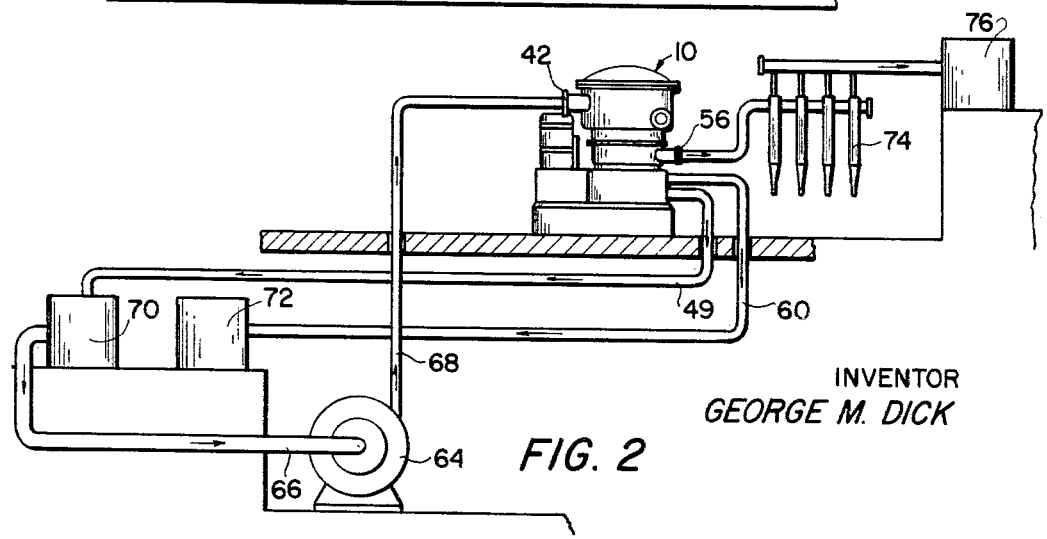
FIG. 2 is a diagrammatic view of a representative paper making system in which the improved plural stage pressure type screening devices of the present invention may be employed in the initial load of the process and where the pulp stock is subjected to its preliminary treatment.

The first stage reject means which communicates with the first stage baffle means accepts portions of the liquid suspension rejected by the first screening means (i.e., first stage reject stream) and transmits the first stage rejected portion to a preliminary stage of the pulp or paper making system. First stage rejects, such as fiber bundles and undesirable dirt, rejected by the first stage screen 24, are forced downwardly under the combined action of the stock flow and gravity and the helical formation of the first stage hydrofoils 32, so as to enter the first stage reject means or gutter 48 from which they are continuously or intermittently removed by the pressure flow in the plural stage pressure type screening device 10. This first stage reject stream in the first stage reject gutter 48 is conducted by a first stage reject conduit 49 to an agitated raw storage stock chest 70 (FIG. 2). The accepted material passing through screen 24 may flow radially directly outwardly with a minimum of turbulence to the inner face of screen 30, as in the construction shown in FIG. 1A.

In some cases it is preferred to interpose a second stage baffle means or plate 50 between screens 24 and 30 for directing the paper or pulp stock upwardly (in the direction of the arrows) through a receiving chamber 51 (defined by the plate 50 and screen 24), radially outwardly through a series of openings 52 in baffle 50 adjacent the upper end of screen 30 and then downwardly, generally parallel to the axis of screens 24 and 30 in receiving chamber 54. The flow of the liquid in chamber 54 is essentially the same with respect to screen 30 as is the flow of liquid in first receiving chamber 46 with respect to screen 24, being directed in as nearly as possible a laminar flow pattern across the inner face of screen 30 toward reject gutter 58 disposed adjacent the bottom or far end of screen 30. The plurality of second stage hydrofoils 34 (operating in the same manner as the first stage hydrofoils 32) direct the paper or pulp stock through screen 30 into screened stock outlet 56 and the second stage undesirable rejects into a second stage reject means or gutter 58. This second stage reject means being in communication with the third receiving chamber means accepts the portion of the liquid suspension rejected by the second stage screening means and transmits it to a later stage of the pulp or paper making system. This second stage reject gutter 58 communicates with a second stage reject conduit 60, which conduit extends from the plural stage pressure type screening device 10 to an agitated semi-refined stock chest 72 (FIG. 2) where such second stage rejects are reprocessed and recovered.

Referring to FIG. 1A, it has been found that with a stock flow (pressurized up to 75 p.s.i.) the first stage screen 24 (having a perforation diameter in the range of about .045″–.090″) and second stage screen 30 (having a perforation diameter with range of about .045″–.090″) may be used. These perforation diameters are cited by way of illustration and may be larger or smaller than the foregoing. It has been found that for best results the second stage screen 30 should be disposed a distance "$d$" away from the first stage screen 24, which should be greater than about 15% of the height "$h$" of the first and second stage screens 24 and 30. The height "$h$" may vary from as little as eighteen inches to as much as three feet.

Figure 1B:
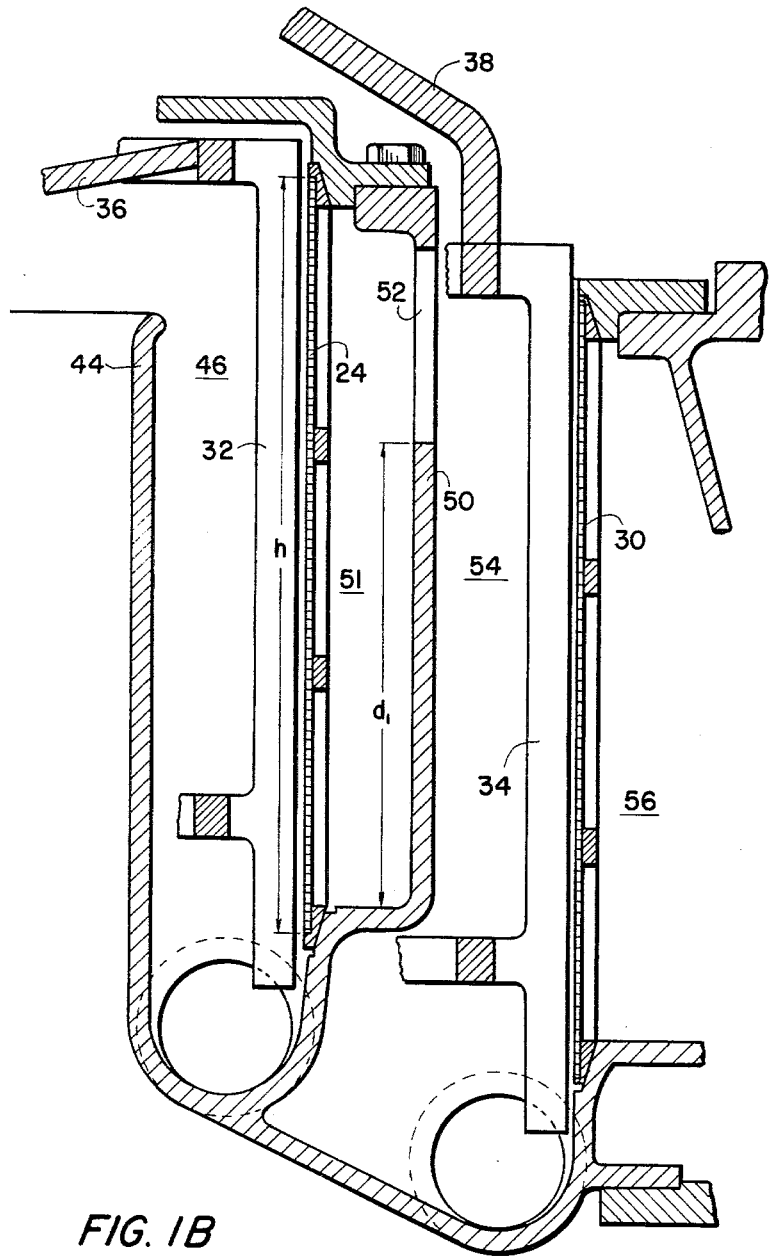
FIG. 1B is a view similar to FIG. 1A of the first and second stage screening means with the second stage baffle means disposed therebetween.

In order to substantially reduce the clogging of the lower portions of the second stage screen 30 (FIG. 1A) by rejected fibers, the second baffle means or plate 50 (FIG. 1B) is used. The gravity fall of the heavier and larger fibers in the third receiving chamber 54 facilitates their deposition in the second stage reject gutter 58. The second baffle plate 50 is disposed substantially midway between the first stage screen 24 and second stage screen 30 and the bottom of the openings 52 in second baffle plate 50 are disposed a distance "$d_1$" from the bottom of the baffle plate, which distance "$d_1$" is desirably about two-thirds of the height "$h$" of the screens 24 and 30, the height of the opening 52 being from 20% to 40% of the height "$h$."

Referring to FIG. 1C, the undesirable material in the first receiving chamber 46 is indicated generally as bundle form fibers 62a, bark 62b, scale 62c and grinder grit 62d. The fibers 63 are desirably to be passed through the first stage screen 24.

In order to illustrate a common application of the improved plural stage screening devices of the present invention, reference is made to FIG. 2 which illustrates apparatus employed in the initial end of the process and where the pulp stock is put through its elementary treatments.

Pulp stock from an agitated raw stock chest 70 is pumped by a stock pump 64 into inlet conduit 66 and through stock line 68 to unscreened stock inlet 42 of the plural stage screening device 10. First stage rejects entering first stage reject conduit 49 are returned to an agitated raw storage stock chest. The second stage rejects from second stage reject conduit 60 are returned to an agitated semi-refined stock chest 72. In turn the screened pulp stock from the screened stock outlet 56 is conducted to a cyclone-type cleaner 74 (which by centrifugal action separates undesirable particles of a heavier specific gravity, such as bark, pipe scale, etc., from the accepted pulp stock) and thence to decker 76 which is a thickening machine for increasing the consistency of the pulp stock from, for example, 0.5% consistency to about 5.0% consistency or ratio by weight of plup stock to liquid.

It will be understood by those skilled in the art that alternatively the plural stage pressure type screening device 10 may be modified as shown in FIGS. 3–6.

*Alternative embodiments*

Figure 3:
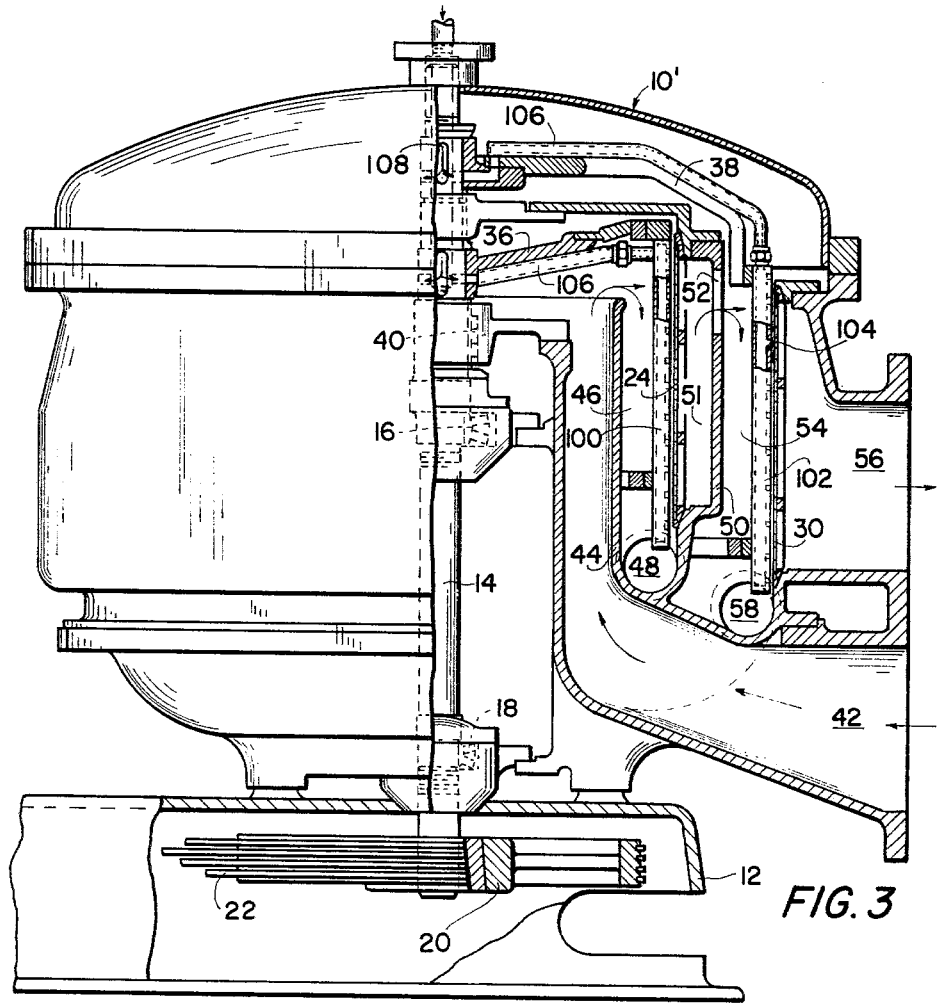
FIG. 3 is a view similar to FIG. 1 of an alternative embodiment of a two stage outward flow pressure type screening device provided with shower pipe arrangement.

As shown in FIG. 3, the first stage hydrofoils 32 and the second stage hydrofoils 34 are replaced by a first stage screen cleaning means (such as a plurality of first stage shower heads or pipes 100) and a second stage cleaning means, such as a plurality of second stage shower heads or pipes 102. The shower pipes 100 and 102 are provided with a plurality of perforations 104 disposed in the face of each of the shower pipes 100 and 102 so as to provide pressurized streams of fluid to clean the screens. These perforations 104 are desirably disposed either normal to the screens 24 and 30 or angularly ahead or behind a line radially normal to the inner periphery of the screens 24 and 30. In addition the perforations 104 are inclined downwardly to direct the rejects from screens 24 and 30 into the gutters 48 and 58. Each pipe 100 and 102 is connected by a conduit 106 to a bore 108 in the upper portion of the rotary shaft 14 (FIG. 3), which bore is connected in turn with a shower water supply means (not shown). It has been found that by the use of the high pressure streams of fluid from the perforations 104, faster cleaning of the screens 24 and 30 results and an attendant higher production output of screened paper stock from the screening device 10' is achieved.

Figure 4:
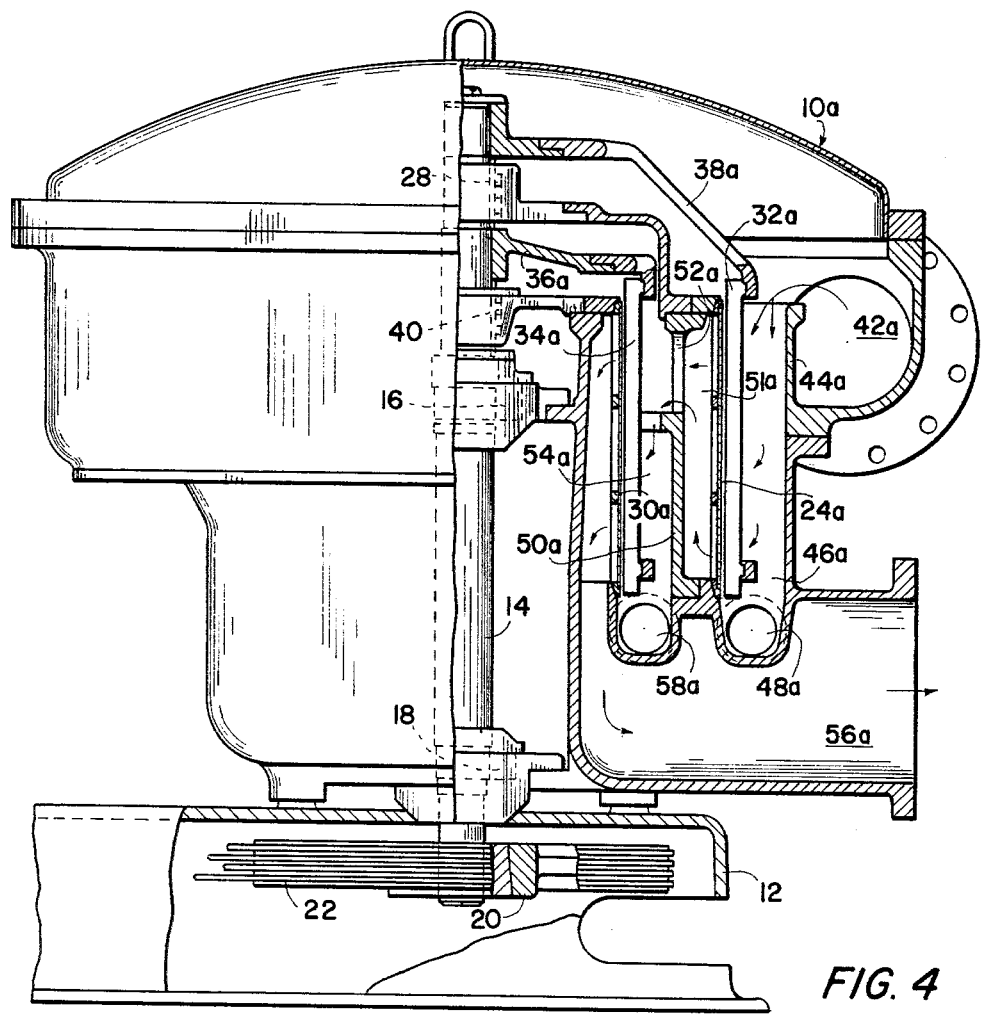
FIG. 4 is a view similar to FIGS. 1 and 3 of a two stage inward flow pressure type screening device.

In FIG. 4 the paper or plup stock from tangential unscreened stock inlet 42a flows inwardly from the first and second stage screens 24a and 30a (in the direction of the arrows) and the finally screened pulp or paper stock flows out through a radial discharge screened stock outlet 56a.

Figure 5:
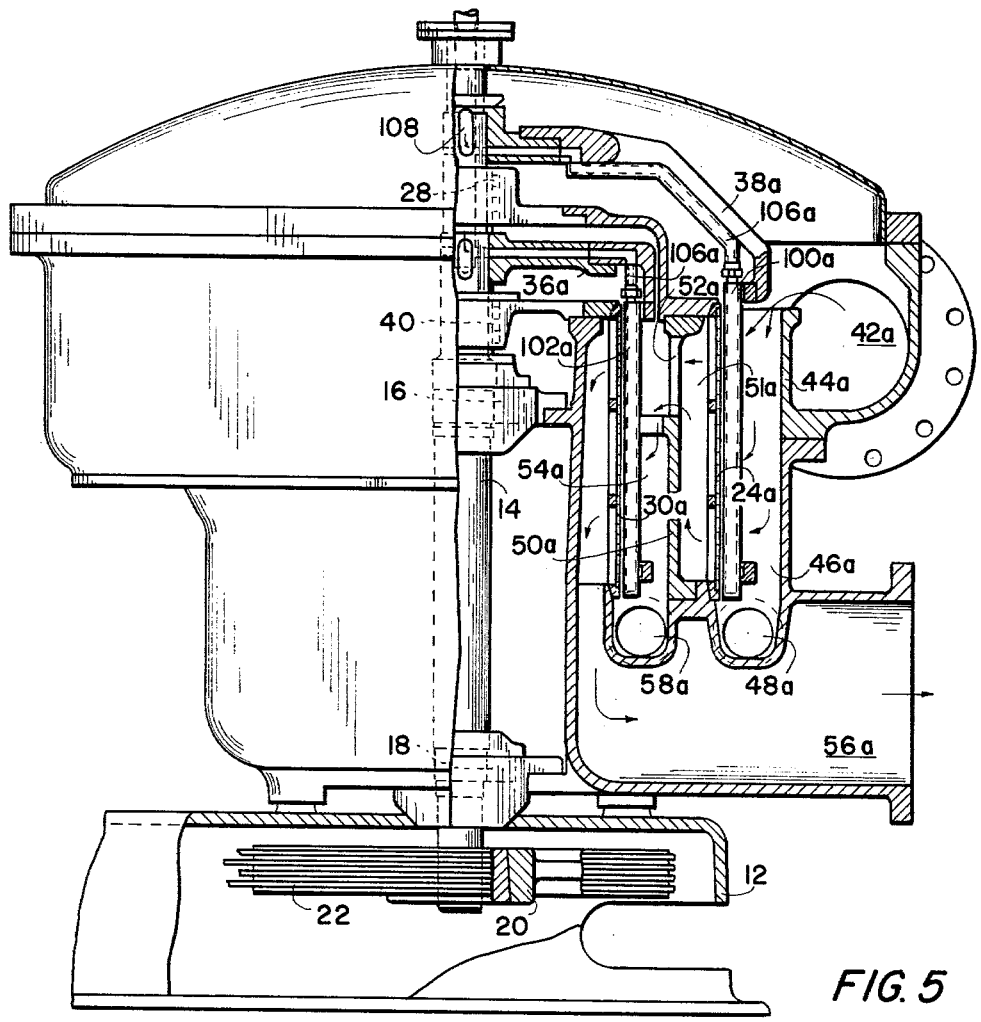
FIG. 5 is a view similar to FIGS. 1 and 3-4 of an alternative embodiment of a two stage inward flow pressure type screening device provided with shower pipe arrangements.
Figure 6:
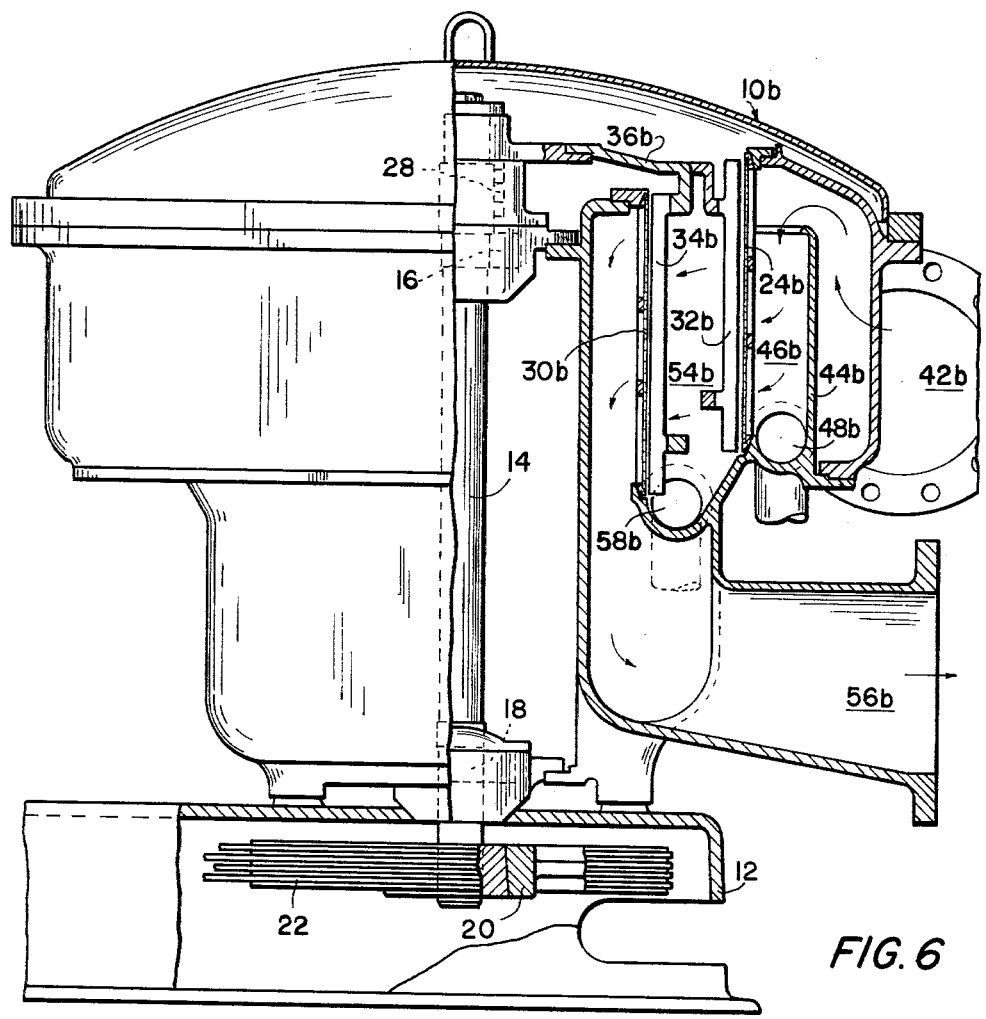
FIG. 6 is a view similar to FIGS. 1 and 3-5 showing a further alternative embodiment of a two stage inward flow pressure type screening device.

Referring to FIG. 5, it will be understood that the first stage hydrofoils 32a and second stage hydrofoils 34a of FIG. 4 may be replaced by the first stage shower pipes 100a and the second stage shower pipes 102a.

In order to provide a simplified mounting structure for hydrofoils 32b and 34b (FIG. 6) or the shower pipes (not shown in FIG. 6) and to eliminate the second stage baffle plate 50a (FIG. 4), first stage hydrofoils 32b are disposed on the downstream side of the first stage screen 24b (in the direction of flow), and the second stage hydrofoils 34b are disposed ahead of or on the upstream side of the second stage screen 30b. The hydrofoils 32b and 34b are mounted on a common rotating spider 36b.

It will be recognized by those skilled in the art that the objects of the present invention have been achieved by providing a plural stage pressure type screening device which maintains the paper stock in optimum condition by disposing the successive screening stages in close proximity to each other with attendant possible higher speed operation of such screening device. In addition, the improved screening device not only eliminates the need for two separate single stage pressure type screening devices heretofore required for two-stage operation, thereby reducing the required floor space, inlet and outlet piping to the screening device and the number of valves required therein for such two stage screening operation, but in addition provides greater efficiency of operation and requires a lower power input than two separate screens in series. Further, the improved screening device segregates the undesirable rejects into a first stage reject stream which is fed back int othe paper making system at a preliminary stage in such system and into a second stage reject stream which is fed back into the system at an intermediate point, therein thus effecting an economy and saving in the processing of such second stage rejects. Yet another benefit of the screening device is a novel screen cleaning means which provides higher production output of screened paper stock from such screening device and which produces stock from which paper sheet of high strength and high uniformity may be made.

While in accordance with the Patent Statutes preferred and alternative embodiments of the present invention have been illustrated and described in detail, it is to be particularly understood that the invention is not limited thereto or thereby.

I claim:

1. A plural stage pressure type screening device for screening a pressurized liquid suspension, said device comprising an inlet for the liquid suspension,
a first stage generally cylindrical screen for passing a first stage screened portion of said suspension,
a second stage generally cylindrical screen disposed generally concentrically with said first stage screen for accepting said first stage screened portion and passing a second stage screened portion,
a first stage cleaning means disposed adjacent said first stage screen for removing clogging particles therefrom,
a second stage cleaning means disposed adjacent said second stage screen for removing clogging particles therefrom,
a first stage generally cylindrical baffle generally concentric with and spaced from said first stage screen and positioned adjacent said inlet and said first stage screen to form a first annular chamber for receiving adjacent one end thereof said liquid suspension from said inlet,
a second stage generally cylindrical baffle disposed between and generally concentrically with said first and second stage screens for forming with said first stage screen a second annular chamber closed at one end for receiving said first stage screened portion, said second chamber being opened adjacent its other end to permit flow of said first stage screened portion to said second screen, said second baffle forming with said second stage screen a third annular chamber for receiving adjacent one end said first stage screened portion from the open end of said second chamber,
first stage reject means communicating with said first chamber at the end remote from the inlet for accepting portions of said liquid suspension rejected by said first stage screen,
second stage reject means communicating with said third chamber at the end remote from said one end for accepting portions of the liquid suspension rejected by said second stage screen,
drive means operatively associated with said first and second stage screens and said first and second stage cleaning means for causing relative rotary movement between said screens and said cleaning means,
and means enclosing said screening device for maintaining said liquid suspension under pressure during its passage therethrough.

2. The screening device claimed in claim 1 wherein:
(a) said first stage screen is disposed adjacent the outside of said screening device for reception of inward flow of said pressurized liquid, and
(b) said second stage screen is disposed inwardly of said first screen.

3. The screening device claimed in claim 1 wherein:
(a) said second stage screen is disposed adjacent the outside of said screening device, and
(b) said first stage screen is disposed inwardly of said second stage screen for reception of outward flow of said pressurized liquid.

4. The screening device claimed in claim 1 wherein:
(a) said first and second cleaning means each comprises a high pressure fluid supply means and a plurality of shower heads connected to said fluid supply means and disposed adjacent the associated screen to remove clogging particles therefrom.

5. The screening device claimed in claim 1 in which the open end of said second chamber is adjacent corresponding ends of both first and second stage screens.

6. The screening device claimed in claim 1 in which the second stage screen is of finer mesh than the first stage screen.

References Cited by the Examiner

UNITED STATES PATENTS

| | | | |
|---|---|---|---|
| 369,834 | 9/1887 | Blackman | 209—210 |
| 591,645 | 10/1897 | Baker | 209—306 |
| 833,540 | 10/1906 | Olsen | 210—247 |
| 1,839,941 | 1/1932 | Zelezniak | 209—270 |
| 2,312,545 | 3/1943 | Haug | 209—270 |
| 2,367,961 | 1/1945 | Piponios | 209—270 |
| 2,405,838 | 8/1946 | Lawson et al. | 210—338 |
| 2,525,701 | 10/1950 | Mathewson | 209—270 |
| 2,707,905 | 5/1955 | Mathewson | 209—303 |
| 2,857,053 | 10/1958 | Schmiedel | 209—270 |
| 2,865,510 | 12/1958 | Greene | 210—342 |

FOREIGN PATENTS

| | | |
|---|---|---|
| 806,887 | 10/1936 | France. |
| 779,796 | 7/1957 | Great Britain. |
| 888,304 | 1/1962 | Great Britain. |

HARRY B. THORNTON, *Primary Examiner.*

HERBERT L. MARTIN, *Examiner.*